United States Patent
Takemasa et al.

(10) Patent No.: US 8,405,981 B2
(45) Date of Patent: Mar. 26, 2013

(54) HOLDING DEVICE FOR INFORMATION PROCESSING DEVICE

(75) Inventors: Hirofumi Takemasa, Kyoto (JP); Masato Murakata, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/594,876

(22) PCT Filed: Feb. 12, 2009

(86) PCT No.: PCT/JP2009/000546
§ 371 (c)(1),
(2), (4) Date: Oct. 6, 2009

(87) PCT Pub. No.: WO2009/101800
PCT Pub. Date: Aug. 20, 2009

(65) Prior Publication Data
US 2010/0296235 A1 Nov. 25, 2010

(30) Foreign Application Priority Data
Feb. 15, 2008 (JP) .................................. 2008-034139

(51) Int. Cl.
*G06F 1/16* (2006.01)
(52) U.S. Cl. ................. 361/679.59; 361/679.21; 294/24
(58) Field of Classification Search ............. 361/679.21, 361/679.59; 294/25
See application file for complete search history.

(56) References Cited

U.S. PATENT DOCUMENTS

| | | | | |
|---|---|---|---|---|
| 3,682,352 | A * | 8/1972 | Doucette | 220/754 |
| 5,169,191 | A * | 12/1992 | Benz | 56/400.01 |
| 5,339,239 | A | 8/1994 | Manabe et al. | |
| 5,479,001 | A * | 12/1995 | Kumar | 235/472.02 |
| 5,779,292 | A * | 7/1998 | Kasday | 294/25 |
| 6,049,813 | A * | 4/2000 | Danielson et al. | 708/100 |
| 6,134,102 | A * | 10/2000 | Worn et al. | 361/679.3 |
| 6,266,685 | B1 * | 7/2001 | Danielson et al. | 708/141 |
| 6,543,695 | B1 * | 4/2003 | Swift et al. | 235/462.43 |
| 6,545,667 | B1 * | 4/2003 | Lilenfield | 345/169 |
| 6,724,618 | B1 * | 4/2004 | Jenkins et al. | 361/679.32 |
| 2003/0121981 | A1 * | 7/2003 | Slutsky et al. | 235/462.45 |
| 2004/0121798 | A1 | 6/2004 | Hamasaki et al. | |
| 2006/0011682 | A1 * | 1/2006 | Christensen et al. | 224/274 |
| 2006/0054704 | A1 * | 3/2006 | Fitch et al. | 235/472.01 |
| 2007/0007353 | A1 * | 1/2007 | Danielson et al. | 235/462.46 |
| 2008/0146118 | A1 * | 6/2008 | Solberg et al. | 450/1 |

FOREIGN PATENT DOCUMENTS

| | | |
|---|---|---|
| JP | H4-20168 U | 2/1992 |
| JP | 08-123417 A | 5/1996 |
| JP | 08-123417 A | 5/1996 |
| JP | 11-272361 A | 10/1999 |

(Continued)

OTHER PUBLICATIONS

International Search Report dated Mar. 17, 2009 for PCT/JP2009/000546.

*Primary Examiner* — Hung S Bui
*Assistant Examiner* — James Wu
(74) *Attorney, Agent, or Firm* — RatnerPrestia

(57) ABSTRACT

A notebook computer body is formed of a front casing and a rear casing having a keyboard. The computer body is provided on its rear surface with a protrusion having a substantially spherical surface and with a hand strap. The hand strap covers the protrusion and has an through hole, thereby allowing the user to securely hold the computer body in one hand.

10 Claims, 8 Drawing Sheets

FOREIGN PATENT DOCUMENTS

| | | |
|---|---|---|
| JP | 2000-105630 A | 4/2000 |
| JP | 2004-164613 A | 6/2004 |
| JP | 2006-251177 | 9/2006 |
| JP | 2006-251177 A | 9/2006 |
| JP | 2007-033941 A | 2/2007 |
| JP | 2007-033941 A | 2/2007 |
| JP | 2007-102532 A | 4/2007 |
| JP | 2009-523095 | 9/2010 |

* cited by examiner

HOLDING DEVICE FOR INFORMATION PROCESSING DEVICE

This application is a U.S. National Phase Application of PCT International Application PCT/JP2009/000546.

TECHNICAL FIELD

The present invention relates to a portable information processing device such as a notebook computer, and more particularly, to a portable information processing device having a belt allowing the user to hold it in one hand, thereby improving portability. Such a belt is generally also referred to as a suspending strap, a hand strap, or the like, and hereinafter uniformly referred to as a "hand strap".

BACKGROUND ART

In recent years, highly portable information processing devices such as notebook computers have come into widespread use, and some of them have a hand strap to improve portability.

A notebook computer generally includes a rear casing for housing a notebook computer body, a keyboard as an input part, and other components, and a front casing for housing a flat display. The front casing is folded over the rear casing by a hinge part.

These notebook computers have been reduced in weight and size in recent years, allowing the user to hold and operate them while standing in more and more situations. The user holds edges of the casings of a notebook computer in one hand, and operates the keyboard with the other hand. It is not easy, however, for the user to operate the keyboard with one hand while precariously holding and supporting the computer in the other hand.

To solve this problem, it has been suggested (see, for example, Patent Documents 1 and 2) to provide a notebook computer with a hand strap on the rear surface of the rear casing, thereby allowing the user to slide one hand through the hand strap to securely hold the computer.

In the conventional structures shown in Patent Documents 1 and 2, however, the hand strap is a mere belt whose both ends are fixed to the rear casing of the notebook computer. The hand strap has too small a contact area with the back of the hand to allow the user to tightly hold the computer with the hand. As a result, the computer may wobble or slip from the hand, and the wobbling may cause the user to press wrong keys on the keyboard.

It is preferable that when holding the notebook computer in one hand and operating the keyboard or the like with the other hand, the user can hold the computer inclined with respect to the hand holding the computer in terms of keyboard input and display visibility. In the conventional structures of the hand straps shown in Patent Documents 1 and 2, however, it is difficult for the user to securely hold the notebook computer in a state inclined with respect to the hand.

Patent Document 1: Japanese Patent Unexamined Publication No. 2000-105630
Patent Document 2: Japanese Patent Unexamined Publication No. 2007-102532

SUMMARY OF THE INVENTION

The information processing device of the present invention includes a rear casing; a front casing facing the rear casing; a protrusion protruding outwardly on a surface of the rear casing; and a belt fixed to the rear casing so as to cover the protrusion.

With this structure, when the user slides one hand between the rear casing and the belt and holds the protrusion with the palm of the hand, the compressive force of the belt allows the user to support the rear casing with the hand without feeling fatigue, and hence, to securely hold the notebook computer.

Figure 1A:
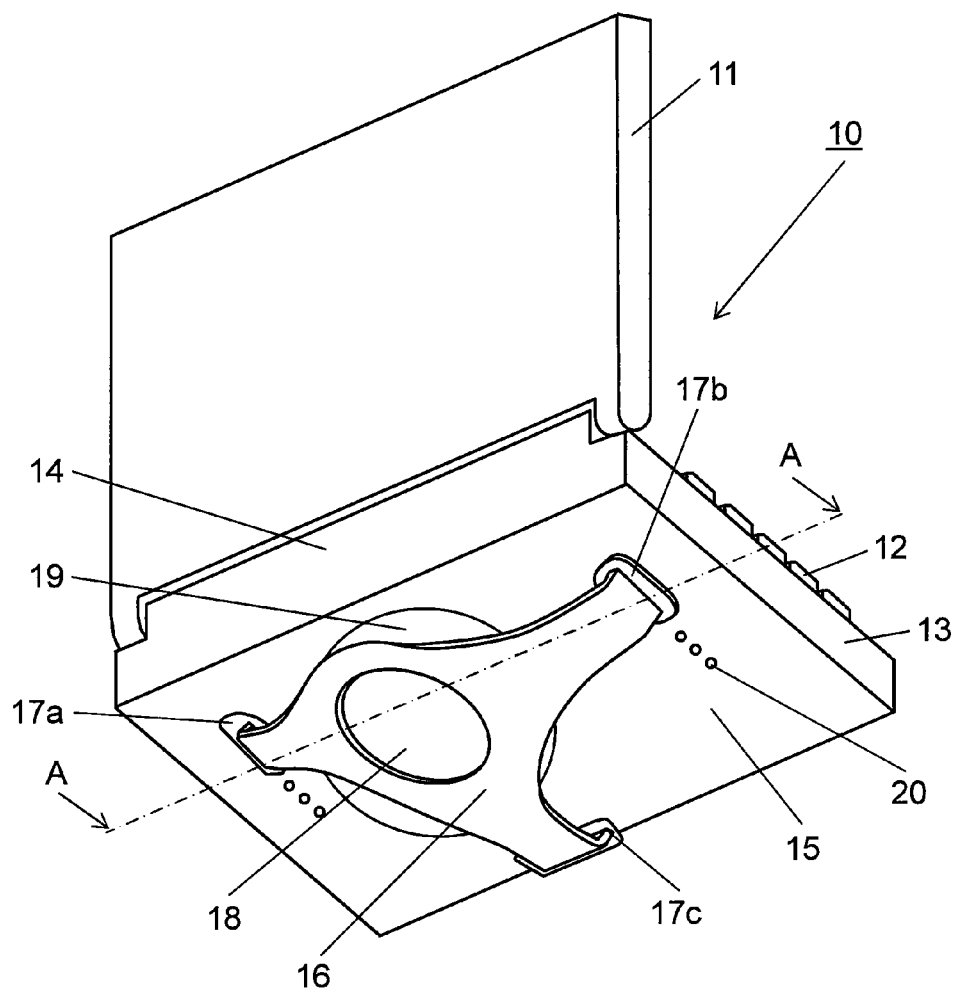
FIG. 1A is a perspective view of a notebook computer as the information processing device according to a first embodiment when seen from below, that is, from the rear side.

REFERENCE MARKS IN THE DRAWINGS 10, 101 notebook computer body
11, 51, 81 front casing
12, 84 keyboard
13, 52, 82 rear casing
14 hinge part
15 rear surface
16, 30, 62 belt (hand strap)
16a, 16b, 16c, 30a, 30b, 62a, 62b fixed end
16d, 30c, 62c sliding part
17a, 17b, 17c, 32a, 32b, 63a, 63b fixed part
18, 31, 61 through hole
19, 60 protrusion
19a, 60a top
20 fixed-part positioning parts
21 one hand
22 third joint
50, 501 NAVI
53, 83 display part
55, 85 operation button
56 low surface area
57 high surface area
58 stepped portion 59, 89 cover
64, 86 handle
65, 87 space
66, 88 grip
80, 801 PDA

DETAILED DESCRIPTION OF PREFERRED EMBODIMENTS

Embodiments of the present invention will be described as follows with reference to drawings.

First Exemplary Embodiment

Figure 1B:
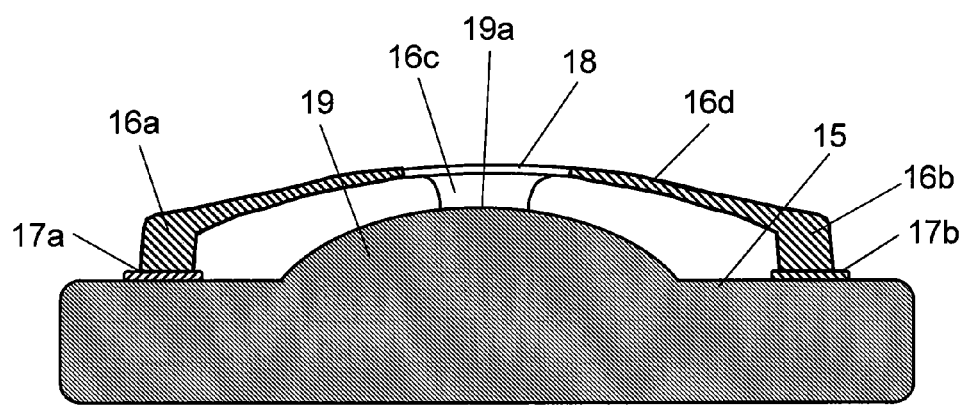
FIG. 1B is a sectional view taken along a line A-A, which is parallel to the longitudinal direction of rear casing 13 of FIG. 1A.

FIG. 1A is a perspective view of a notebook computer as the information processing device according to a first embodiment when seen from below, that is, from the rear side. FIG. 1B is a sectional view taken along a line A-A, which is parallel to the longitudinal direction of rear casing 13 of FIG. 1A. The notebook computer includes notebook computer body 10 formed of front casing 11 and rear casing 13 facing each other and connected openably and closably by hinge part 14. Front casing 11 houses a display part such as a liquid crystal display (not shown), and rear casing 13 houses a CPU, a HDD, and an input part such as keyboard 12. In FIG. 1A, front casing 11 is in an open state so that the user can see the display on front casing 11.

Rear casing 13 is provided on its rear surface 15 with belt (hereinafter, hand strap) 16, with which the user holds and supports computer body 10. Hand strap 16 is a substantially T-shaped belt fixed to rear casing 13 at three points: fixed parts 17a, 17b, and 17c, and is provided substantially at its center with substantially circular through hole 18. The term "substantially T-shaped" means that fixed part 17c is formed in a position perpendicular to the segment which is parallel to hinge part 14 and connects fixed parts 17a and 17b.

Rear surface 15 has protrusion 19 with a substantially spherical surface as shown in FIG. 1B. Through hole 18 of hand strap 16 is formed in the position corresponding to top 19a of protrusion 19. Hand strap 16 is made of stretchable hard rubber or an elastic resin such as polybutylene terephthalate or elastomeric material. Rear surface 15 also has fixed-part positioning parts 20 in order to change the positions of fixed parts 17a, 17b, and 17c of hand strap 16 according to the size and desired position of the hand of the user, or in order to remove hand strap 16. Hand strap 16 has a pair of fixed ends 16a and 16b, which are engaged with fixed parts 17a and 17b, respectively. Fixed ends 16a and 16b are thicker than sliding part 16d through which the user slides the back of the hand.

Figure 2:
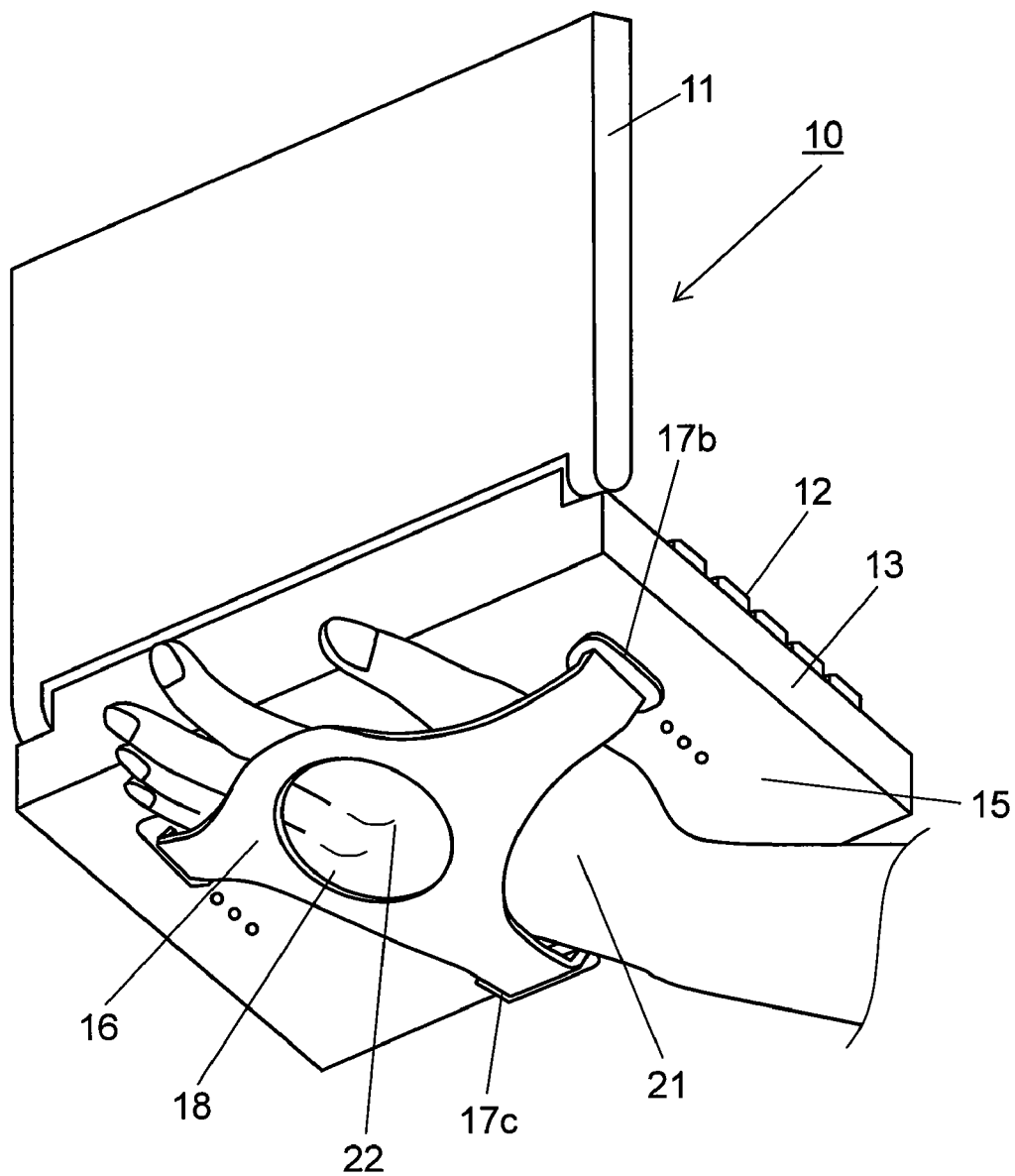
FIG. 2 is a perspective view of the notebook computer as the information processing device according to the first embodiment when held in one hand.

The following is a description of how to hold notebook computer body 10 of the notebook computer according to the present embodiment in one hand and to operate it with the other hand. FIG. 2 is a perspective view of computer body 10 of the notebook computer as the information processing device according to the first embodiment when held in one hand.

As shown in FIG. 2, the user slides one hand 21 between hand strap 16 and rear surface 15 of computer body 10, and holds protrusion 19 having a spherical surface with the palm of one hand 21. At this moment, third joints 22 of the index, middle, and annular fingers of one hand 21 protrude from through hole 18. As a result, the palm of one hand 21 is in contact with protrusion 19 in a large area, and the back of one hand 21 is in contact with hand strap 16 in a large area, thus establishing a firm contact between one hand 21 and computer body 10. When one hand 21 is slid between hand strap 16 and rear surface 15, the part of the back of one hand 21 that corresponds to protrusion 19 protrude from through hole 18. This reduces the incidence of compression and numbness of one hand 21. In addition, the friction force between the peripheral edge of through hole 18 and the back of one hand 21 exposed from through hole 18 assists the user to securely hold computer body 10 in a desired direction without extra force.

Since hand strap 16 is substantially T-shaped in the present embodiment, the user can hold computer body 10 at an inclination of about 45 degrees with respect to one hand 21. Thus, the notebook computer allows the user to hold computer body 10 comfortably in one hand just in front of his/her face and to perform key inputs without feeling fatigue.

As described above, hand strap 16 is substantially T-shaped to be fixed to rear surface 15 of computer body 10 at three points, and has substantially circular through hole 18 substantially at its center. This allows the user to position one hand 21 after sliding it between two adjacent fixed parts 17b and 17c to hold computer body 10. This also allows the user to limit the rotational degrees of freedom of one hand 21 by pressing third joints 22 and their vicinity on the back of one hand 21 protruding from through hole 18 against the outer periphery of through hole 18. The elastic force of hand strap 16 made of stretchable rubber, elastomeric material, or the like assists the user to further firmly hold computer body 10 in one hand 21. Hand strap 16 having the bilaterally symmetrical shape (T-shape) can be used by both right-handed and left-handed people. When sliding one hand 21 between adjacent fixed parts 17b and 17c of substantially T-shaped hand strap 16, the user can hold computer body 10 at an inclination of about 45 degrees on the palm of one hand 21. This results in an improvement in input operability and display visibility.

Thus, when using the computer while standing, the user can firmly hold computer body 10 in one hand without feeling fatigue, resulting in a reduction in the risk of dropping it, and hence, in an improvement in operability and visibility.

As shown in FIG. 1B, fixed ends 16a and 16b of hand strap 16 are preferably thicker than sliding part 16d. In addition, the distance between rear surface 15 and the tips of fixed ends 16a and 16b can be larger than the distance between rear surface 15 and top 19a of protrusion 19 because of the following reason. As described above, sliding part 16d of hand strap 16 is an elastic body, and fixed ends 16a and 16b, which are also elastic bodies, are thicker than sliding part 16d so as to be rigid. Therefore, when computer body 10 is put on a flat desk, the back of computer body 10, that is, the hinge part 14 side of FIG. 1A becomes higher than the front side so that keyboard 12 can be tilted. With this structure, the compressive force applied by the user when pressing keys is absorbed in fixed ends 16a and 16b to improve operability. Furthermore, the elasticity of sliding part 16d absorbs the impact when computer body 10 is placed on the desk.

In this case, fixed part 17c is engaged with fixed end 16c of hand strap 16, which is preferably as thick as sliding part 16d so that keyboard 12 is tilted as expected. With this structure, fixed ends 16a, 16b, and 16c function as foot rubbers of computer body 10 for reducing the impact when it is placed on a flat surface.

Alternatively, keyboard 12 can be tilted by satisfying the following three conditions. Fixed parts 17a and 17b are equal in height from rear surface 15 and larger in height than top 19a of protrusion 19; fixed part 17c is smaller in height from rear surface 15 than fixed parts 17a and 17b; and fixed parts 17a and 17b are provided with resin or metallic rims having a higher rigidity than hand strap 16. By making them of an elastic material, fixed parts 17a and 17b can be functioned as foot rubbers in the same manner as fixed ends 16a, 16b, and 16c.

The information processing device according to the present embodiment allows the user to hold computer body 10 with the palm and back of one hand 21, leaving the thumb and fingers free. Therefore, the user can place the tips of the thumb and fingers on the surface having hinge part 14 as shown in FIG. 2. This results in a further improvement in the stability of computer body 10 while it is being held. It is also possible that second auxiliary keys having the same function as the auxiliary keys on keyboard 12 are arranged in positions within the reach of fingertips so as to further improve operability.

As described above, the information processing device according to the present embodiment allows the user to securely hold the computer body in one hand and to perform key inputs with the other hand, thereby improving operability and visibility.

Second Exemplary Embodiment

Figure 3A:
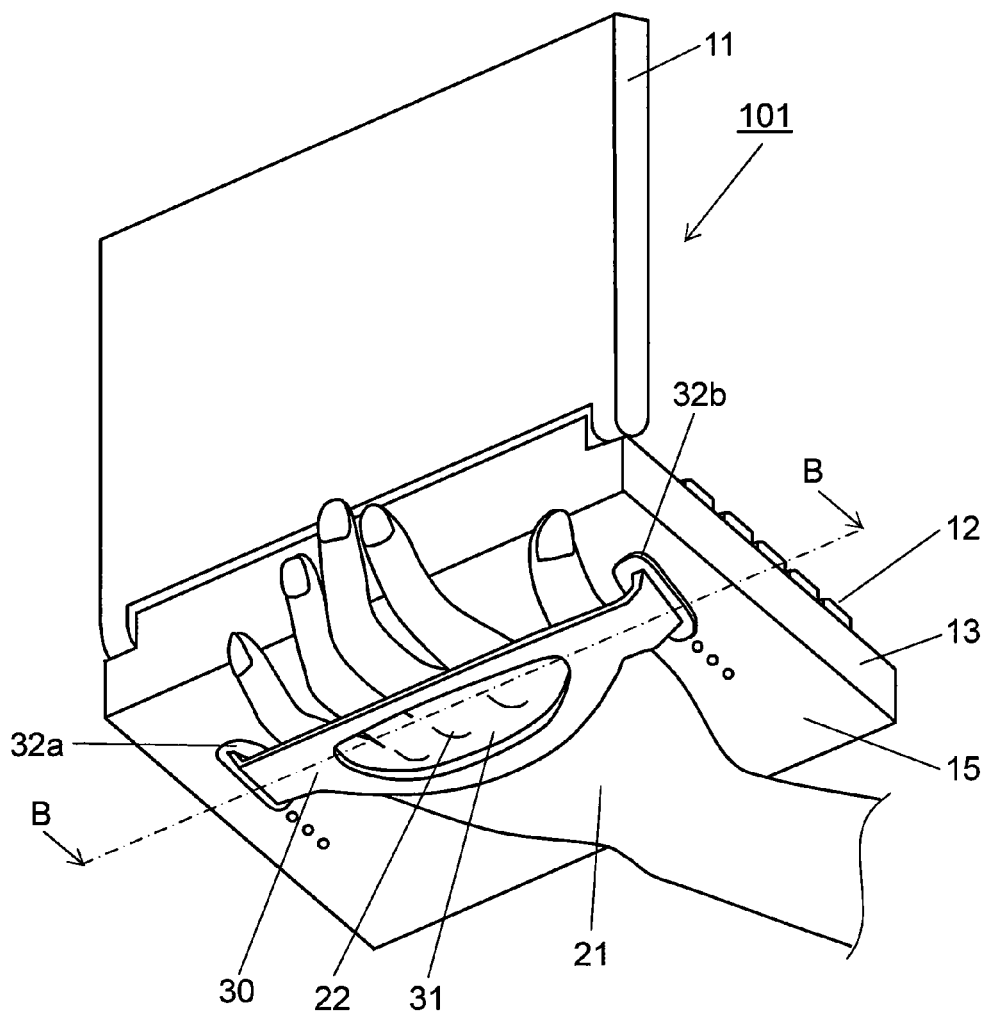
FIG. 3A is a perspective view of a notebook computer as the information processing device according to a second embodiment when held in one hand.
Figure 3B:
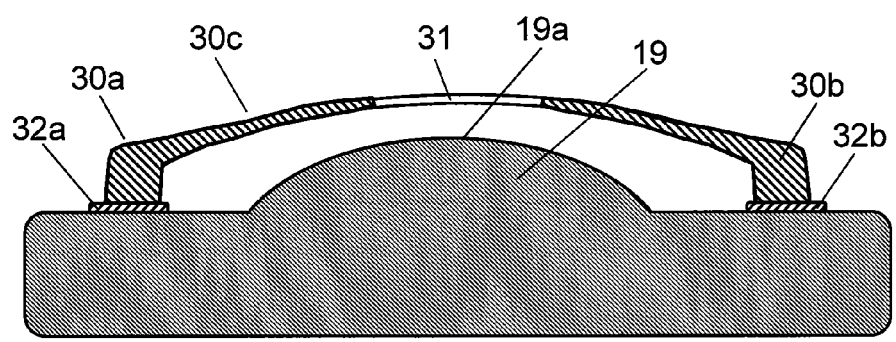
FIG. 3B is a sectional view taken along a line B-B, which is parallel to the longitudinal direction of the rear casing of FIG. 3A.

FIGS. 3A and 3B show a second embodiment of a notebook computer. FIG. 3A is a perspective view of a notebook computer as the information processing device according to the second embodiment when held in one hand. FIG. 3B is a sectional view taken along a line B-B, which is parallel to the longitudinal direction of the rear casing of FIG. 3A. In FIGS. 3A and 3B, like components are labeled with like reference numerals with respect to FIGS. 1A, 1B, and FIG. 2, and hence the description thereof will be omitted.

As shown in FIG. 3A, a notebook computer as the information processing device according to the present embodiment includes notebook computer body 101. In the same manner as in the first embodiment, as shown in FIG. 3B, computer body 101 is provided on rear surface 15 of rear casing 13 with protrusion 19 having a spherical surface similar to the one shown in FIG. 1B.

The present embodiment includes hand strap 30 fixed at two points instead of hand strap 16 fixed at three points of the first embodiment. Hand strap 30 is a belt which has substantially oval through hole 31 in a position corresponding to top 19a of protrusion 19 and is fixed at both ends thereof to fixed parts 32a and 32b on rear surface 15. Through hole 31 can be formed in other shapes as long as it is large enough to allow the back of one hand 21 holding computer body 101 to project therefrom. Fixed parts 32a and 32b can be changed in position so as to adjust the length of hand strap 30 according to the size of one hand 21 and the angle at which the user wants to hold computer body 101. Similar to hand strap 16 of the first embodiment, hand strap 30 is made of stretchable hard rubber or an elastic resin such as polybutylene terephthalate or elastomeric material.

Hand strap 30 has fixed ends 30a and 30b, which are engaged with fixed parts 32a and 32b, respectively, on rear surface 15. Fixed ends 30a and 30b are thicker than sliding part 30c through which the user slide the back of the hand. The height of fixed ends 30a and 30b from rear surface 15 to their tips is larger than the height of protrusion 19 from rear surface 15 to top 19a.

The following is a description of how to hold notebook computer body 101 of the present embodiment in one hand and to operate it with the other hand. The user slides one hand 21 between hand strap 30 and rear surface 15 of computer body 101, and holds protrusion 19 along its outer periphery with the palm of one hand 21. At this moment, third joints 22 of the index, middle, and annular fingers project from through hole 31. As a result, the palm of one hand 21 is in contact with protrusion 19 in a large area, and the back of one hand 21 is in contact with hand strap 30 in a large area, thus establishing a firm contact between one hand 21 and computer body 101. When one hand 21 is slid between hand strap 30 and rear surface 15, the part of the back of one hand 21 that corresponds to protrusion 19 projects from through hole 31. This reduces the incidence of compression and numbness of the hand. In addition, the friction force between the peripheral edge of through hole 31 and the back of one hand 21 exposed from through hole 31 assists the user to securely hold computer body 101 in a desired direction without extra force.

Hand strap 30 used in the present embodiment, which is a belt fixed at two points, occupies so small a space that it is suitable for use in, for example, compact portable information processing devices and game machines having a liquid crystal display of about 8.9 inches.

In the present embodiment using hand strap 30, which is a belt fixed at two points, the user presses protrusion 19 by the palm bent along the outer periphery of protrusion 19 while protruding third joints 22 of the index, middle, and annular fingers from through hole 31 with these fingers bent. As a result, the user can tightly hold computer body 101. Thus, when using the computer while standing, the user can firmly hold computer body 101 in one hand 21, resulting in a reduction in the risk of dropping it.

When computer body 101 is placed on a flat desk, sliding part 30c of hand strap 30 made of rubber, elastomer, or the like bends and allows the tips of fixed ends 30a and 30b to come into contact with the flat surface of the desk. As a result, keyboard 12 is placed tilted on the desk so as to improve input operability and to make fixed ends 30a and 30b function as foot rubbers in the same manner as in the first embodiment.

In the present second embodiment, hand strap 30 has through hole 31 from which third joints 22 of one hand 21 project. As a result, the user can securely hold computer body 101 even at an inclination of about 45 degrees with respect to one hand 21. Thus, the notebook computer allows the user to hold computer body 101 comfortably in one hand just in front of his/her face, thereby improving operability in, for example, key input and display visibility.

The information processing device according to the present embodiment allows the user to hold computer body 101 with the palm and back of the hand, leaving the thumb and fingers free. Therefore, the user can place the tips of the thumb and fingers on the surface having hinge part 14 (see FIG. 1A) as shown in FIG. 3A. This results in a further improvement in the stability of computer body 101 while it is being held. It is also possible that second auxiliary keys having the same function as the auxiliary keys on keyboard 12 are arranged in positions within the reach of fingertips so as to further improve operability.

Third Exemplary Embodiment

Figure 4:
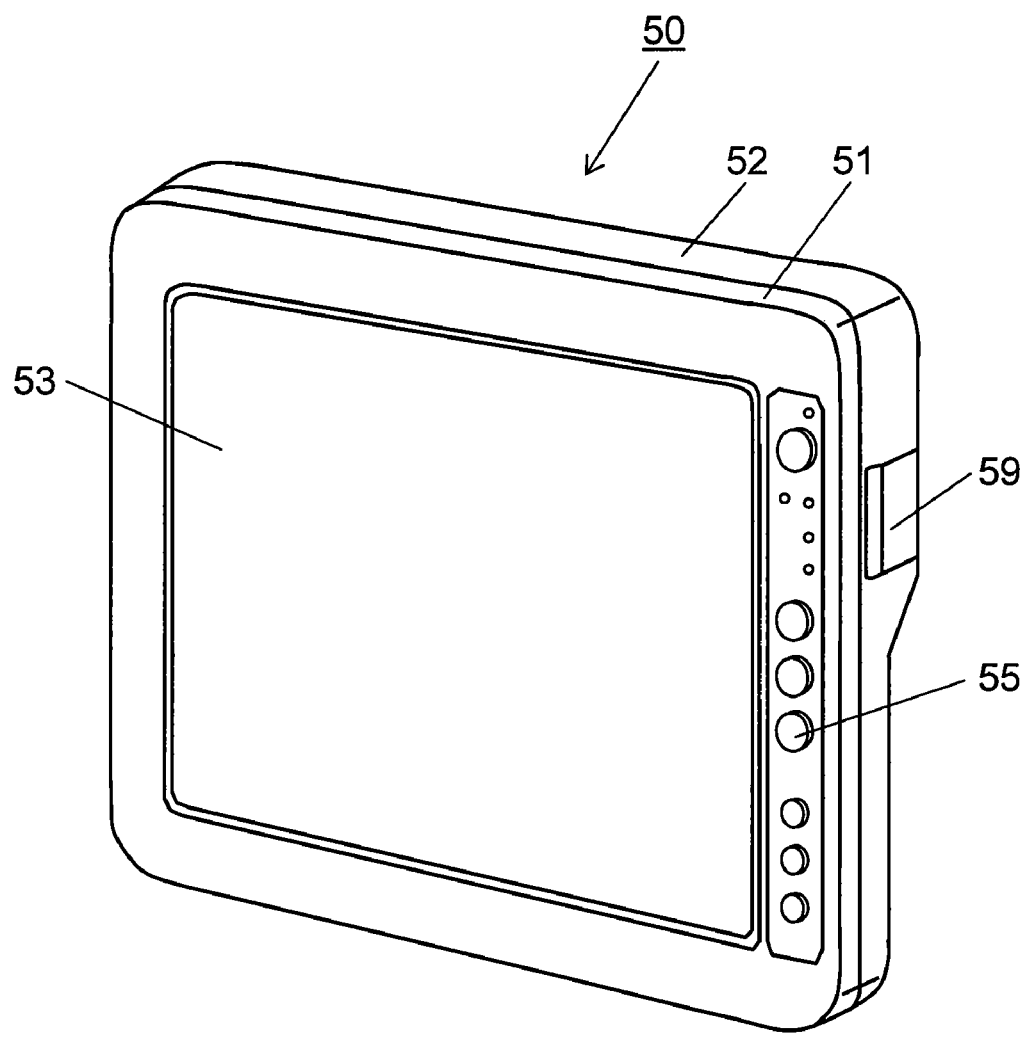
FIG. 4 is a perspective view of an information processing device according to a third embodiment when seen from the front side.
Figure 5:
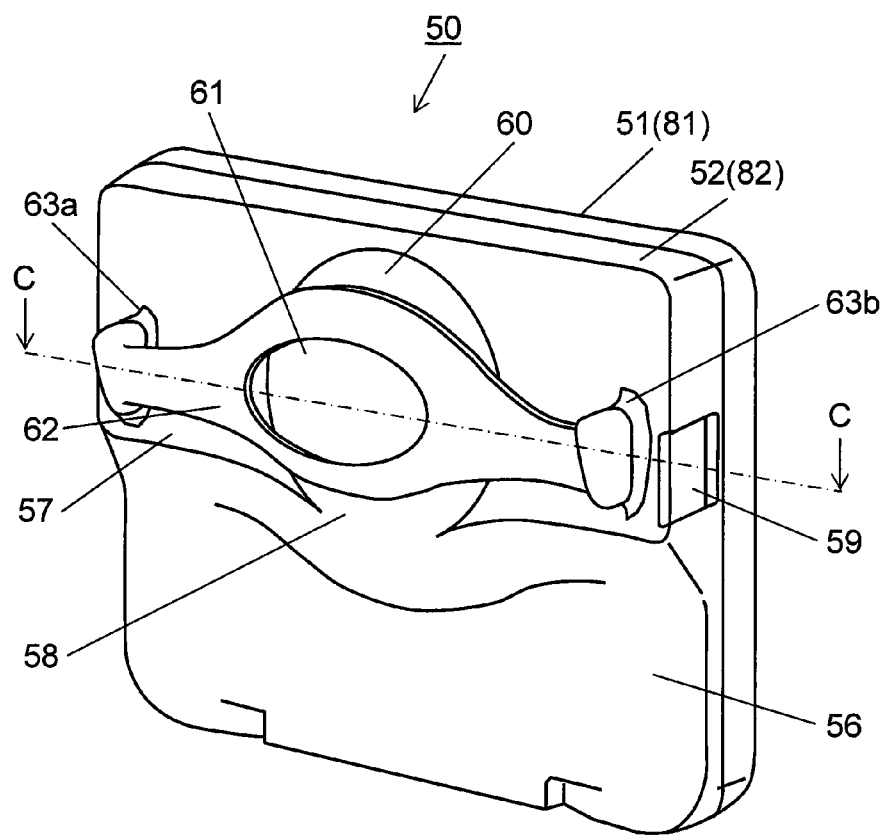
FIG. 5 is a perspective view of the information processing device according to the third embodiment when seen from the rear side.
Figure 6:
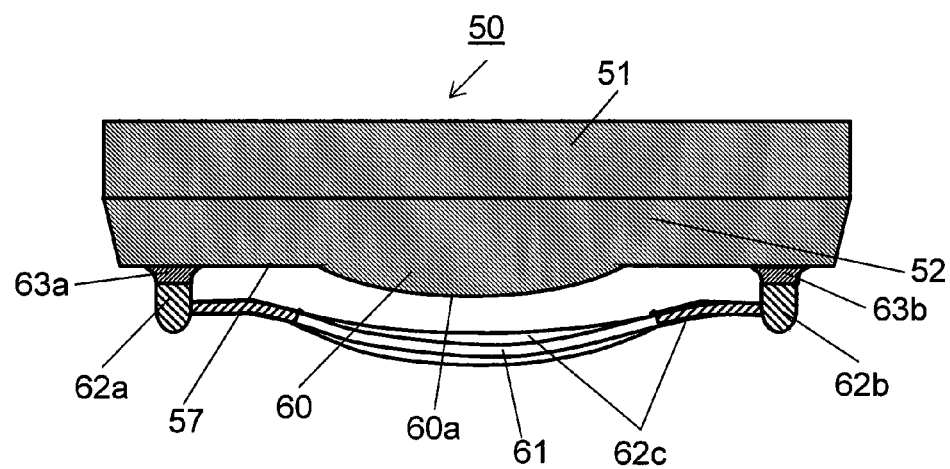
FIG. 6 is a sectional view taken along a line C-C of FIG. 5.

The first and second embodiments have described information processing devices including front casing 11 having a display part and rear casing 13 having an input part, front and rear casings 11 and 13 being supported rotatably by hinge part 14. A third embodiment, on the other hand, will describe an information processing device in which a display part and an input part are arranged in the same casing. FIG. 4 is a perspective view of the information processing device according to the third embodiment when seen from the front side. FIG. 5 is a perspective view of the information processing device when seen from the rear side. FIG. 6 is a sectional view taken along a line C-C of FIG. 5.

As shown in FIGS. 4, 5, and 6, the information processing device according to the present embodiment includes display part 53 and operation buttons 55 on the front side. The information processing device can be, for example, a portable navigation system (hereinafter, NAVI), a personal digital assistant (hereinafter, PDA), or a game machine. In the present embodiment, a NAVI will be described as the information processing device. NAVI 50 is formed of front casing 51 and rear casing 52, which are molded from a resin or the like. As shown in FIG. 4, front casing 51 includes display part 53 such as a liquid crystal display for displaying visual information and operation buttons 55 or control buttons for controlling the visual information such as menu selection on the display screen. Thus, the user can perform all the operations of NAVI 50 on the front side.

As shown in FIG. 5, molded rear casing 52 has substantially rectangular low surface area 56, and high surface area 57, which is contiguous with and is thicker than low surface area 56. On the boundary between low and high surface areas 56 and 57, there is provided inclined, stepped portion 58. High surface area 57 having a large thickness includes an internal space for housing, for example, batteries as the power supply of NAVI 50. In this case, rear casing 52 is provided on a side surface thereof with cover 59 opened for battery replacement or with a connection terminal of an external device such as a USB flash drive according to the need. High surface area 57 is provided substantially at its center with protrusion 60 having a spherical surface. Part of the bottom of protrusion 60 crosses stepped portion 58 and projects toward low surface area 56.

High surface area 57 is further provided with hand strap 62, which covers protrusion 60 and has through hole 61 in a position facing top 60a of protrusion 60. Hand strap 62 is fixed at both ends thereof to rear casing 52 by fixed parts 63a and 63b.

Fixed parts 63a and 63b can be changed in position so as to adjust the length of hand strap 62. Similar to hand straps 16 and 30 of the first and second embodiments, hand strap 62 is made of stretchable rubber or an elastic resin such as polybutylene terephthalate or elastomeric material.

As shown in FIG. 6, hand strap 62 includes fixed ends 62a and 62b, which are thicker than sliding part 62c through which the user slides the back of the hand. Fixed ends 62a and 62b are equal in height from high surface area 57, and larger in height than top 60a of protrusion 60 from high surface area 57. When NAVI 50 is placed on a flat desk, sliding part 62c of hand strap 62 is elastically deformed by the weight of NAVI 50 and flattened because it is thinner than fixed ends 62a and 62b. Fixed ends 62a and 62b, on the other hand, are thicker than sliding part 62c so as to be rigid, and have an equal or larger height than top 60a of protrusion 60 from high surface area 57. As a result, NAVI 50 can be placed tilted securely on the desk. NAVI 50 can be placed tilted further securely on the desk by making fixed ends 62a and 62b lower from high surface area 57 toward low surface area 56 as shown in FIG. 5. Thus, when NAVI 50 is placed on the desk, display part 53 is tilted to improve visibility and the operability of operation buttons 55.

When made of the same elastic material as sliding part 62c, fixed ends 62a and 62b perform the function as foot rubbers of NAVI 50. As a result, NAVI 50 does not receive a large impact when the user places rear casing 52 on a flat surface such as a desk, operates display part 53, or presses operation buttons 55, thus further improving operability.

The following is a description of how to hold NAVI 50 according to the present embodiment in one hand and to operate it with the other hand. The user slides one hand between hand strap 62 and rear casing 52 of NAVI 50, and holds protrusion 60 along its outer periphery with the palm of the hand while protruding the third joints of the index, middle, and annular fingers from through hole 61. As a result, the palm of the hand (see FIG. 3A) holding NAVI 50 is in contact with protrusion 60 in a large area, and the back of the hand is in contact with hand strap 62 in a large area, thus establishing a firm contact between the hand and NAVI 50. When the hand is slid between hand strap 62 and rear casing 52, the back of the hand corresponding to protrusion 60 projects from through hole 61. This reduces the incidence of compression and numbness of the hand. In addition, the friction force between the peripheral edge of through hole 61 and the back of the hand exposed from through hole 61 assists the user to securely hold NAVI 50 in a desired direction without extra force.

Hand strap 62 used in the present embodiment, which is a belt fixed at two points, occupies so small a space that it is suitable for use in, for example, further compact NAVIs and game machines.

Although hand strap 62 is a mere single belt, there is little risk of NAVI 50 being dropped because the user can press protrusion 60 by the palm bent along the outer periphery of protrusion 60 while protruding the third joints of the index, middle, and annular fingers from through hole 61 with these fingers bent. Thus, when using NAVI 50 while standing, the user can hold it firmly and securely in one hand, resulting in a reduction in the risk of dropping it.

NAVI 50 allows the user to hold it with the palm and back of one hand, leaving the thumb and fingers free. Therefore, the user can place the tips of the thumb and fingers on the top end surface of rear casing 52 in the same manner as in FIG. 3A. This results in a further improvement in the stability of NAVI 50 while it is being held. It is also possible that auxiliary buttons are arranged, for example, on a side surface within the reach of fingertips so as to further improve the operability of NAVI 50.

In the present embodiment, hand strap 62 has through hole 61 from which third joints of one hand project. As a result, the user can securely hold NAVI 50 at an arbitrary inclination (for example, 45 degrees) with respect to the hand. Thus, NAVI 50 allows the user to hold it comfortably in one hand just in front of his/her face, thereby improving operability in, for example, key input and the visibility of display part 53.

In the present embodiment, rear casing 52 is provided on the rear surface with substantially rectangular low surface area 56, high surface area 57 contiguous with low surface area 56, and inclined stepped portion 58 on the boundary between low and high surface areas 56 and 57. Part of the bottom of protrusion 60 formed on high surface area 57 crosses stepped portion 58 and projects toward low surface area 56. This allows the user to place the part extending from third joints to the wrist of the hand on low surface area 56 when bending the palm of the hand along protrusion 60. As a result, the user is provided with a higher degree of freedom in adjusting the angle perpendicular to the palm holding NAVI 50, thereby feeling much less fatigue.

Figure 7:
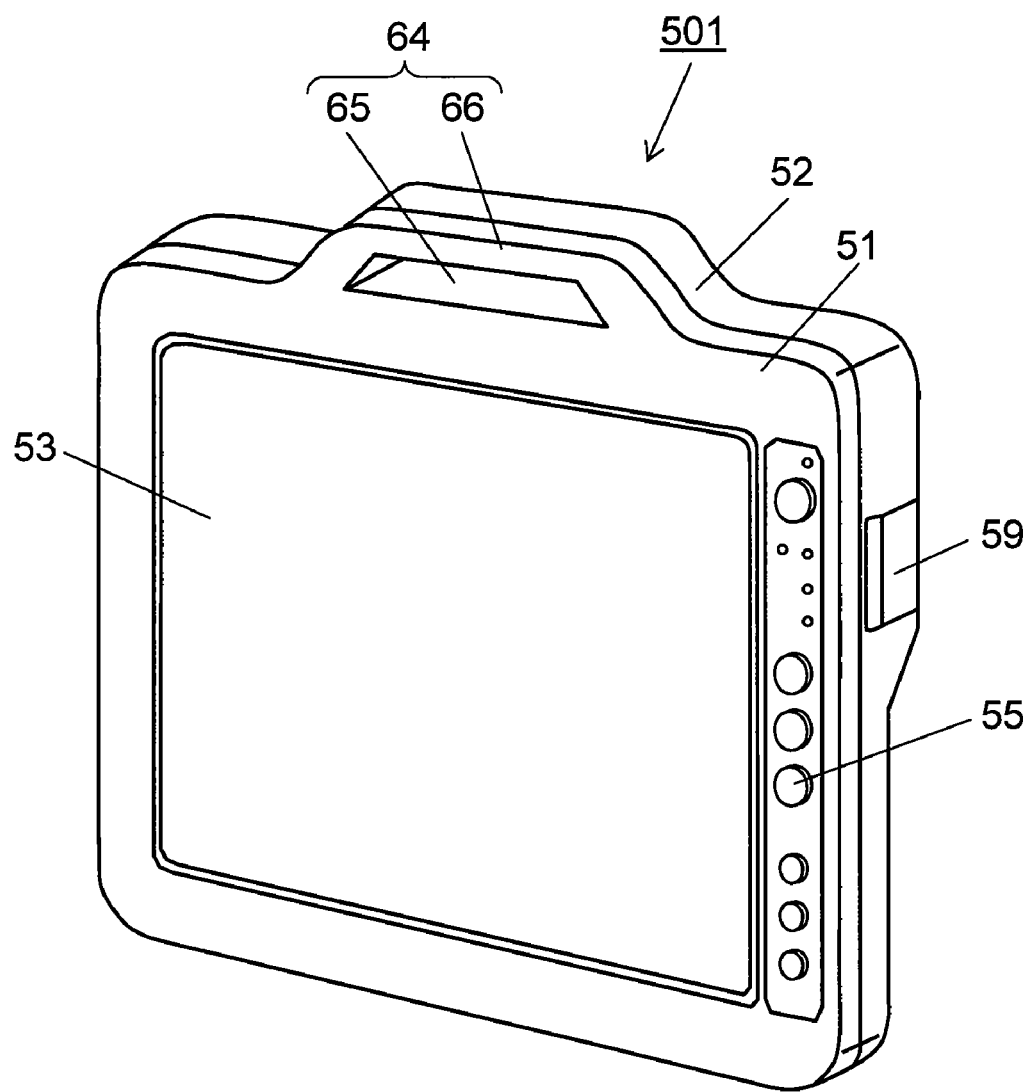
FIG. 7 is a perspective view of another example of the information processing device according to the third embodiment.

FIG. 7 is a perspective view of an example, other than NAVI 50, of the information processing device according to the present third embodiment. In FIG. 7, NAVI 501 is identical to NAVI 50 of FIG. 4 except in having handle 64 on the upper end of NAVI 50, that is, above display part 53. Handle 64 includes grip 66 and space 65. The presence of handle 64 facilitates the portability of NAVI 501 and the transition from a state in which NAVI 501 is held in one hand using hand strap 62 to a state in which NAVI 501 is placed on the desk. When holding rear casing 52 in one hand as mentioned above, the user can slide the thumb and fingers of the hand into space 65 to hold NAVI 501 more securely.

As described above, NAVIs 50 and 501 according to the present embodiment allow the user to securely hold them in one hand slid between hand strap 62 and rear casing 52, and to operate operation buttons 55 with the other hand. This results in an improvement in operability and the visibility of display part 53.

Fourth Exemplary Embodiment

Figure 8:
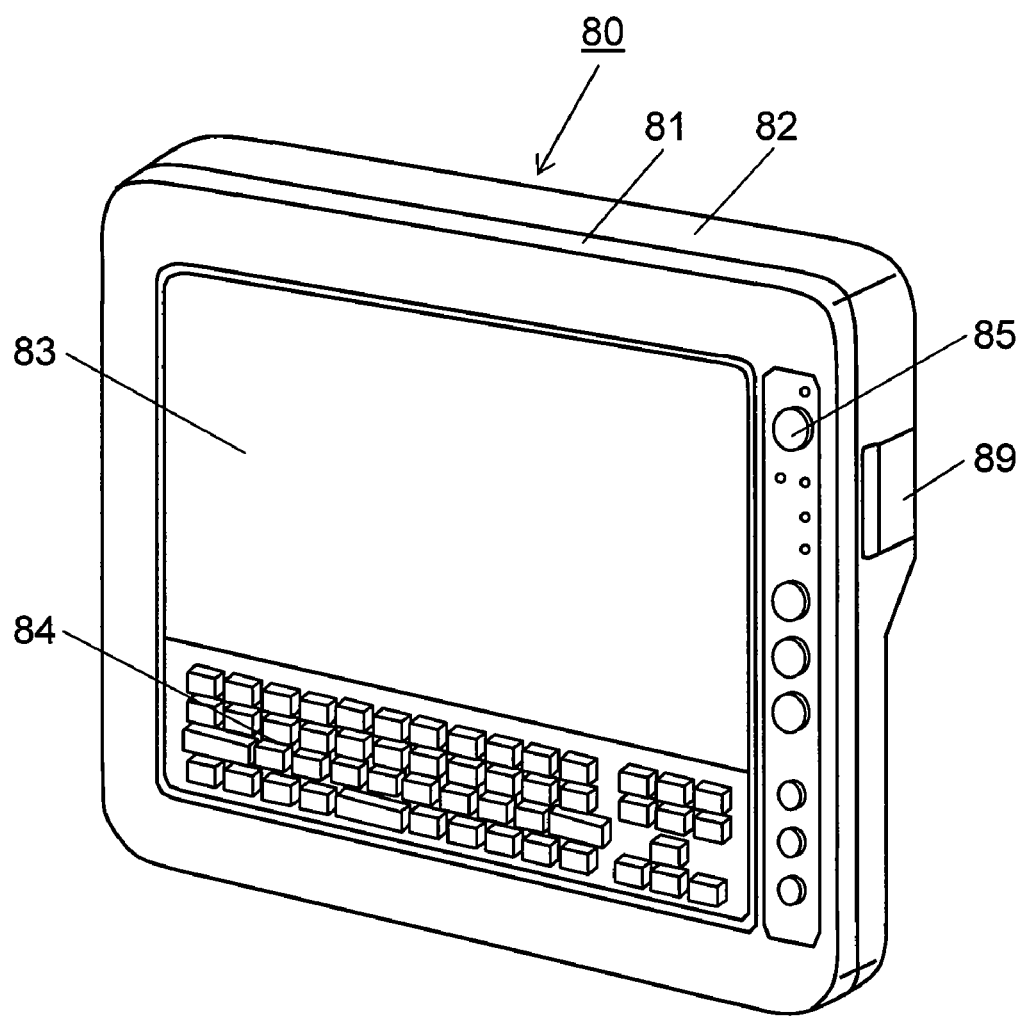
FIG. 8 is a perspective view of an information processing device according to a fourth embodiment when seen from the front side.
Figure 9:
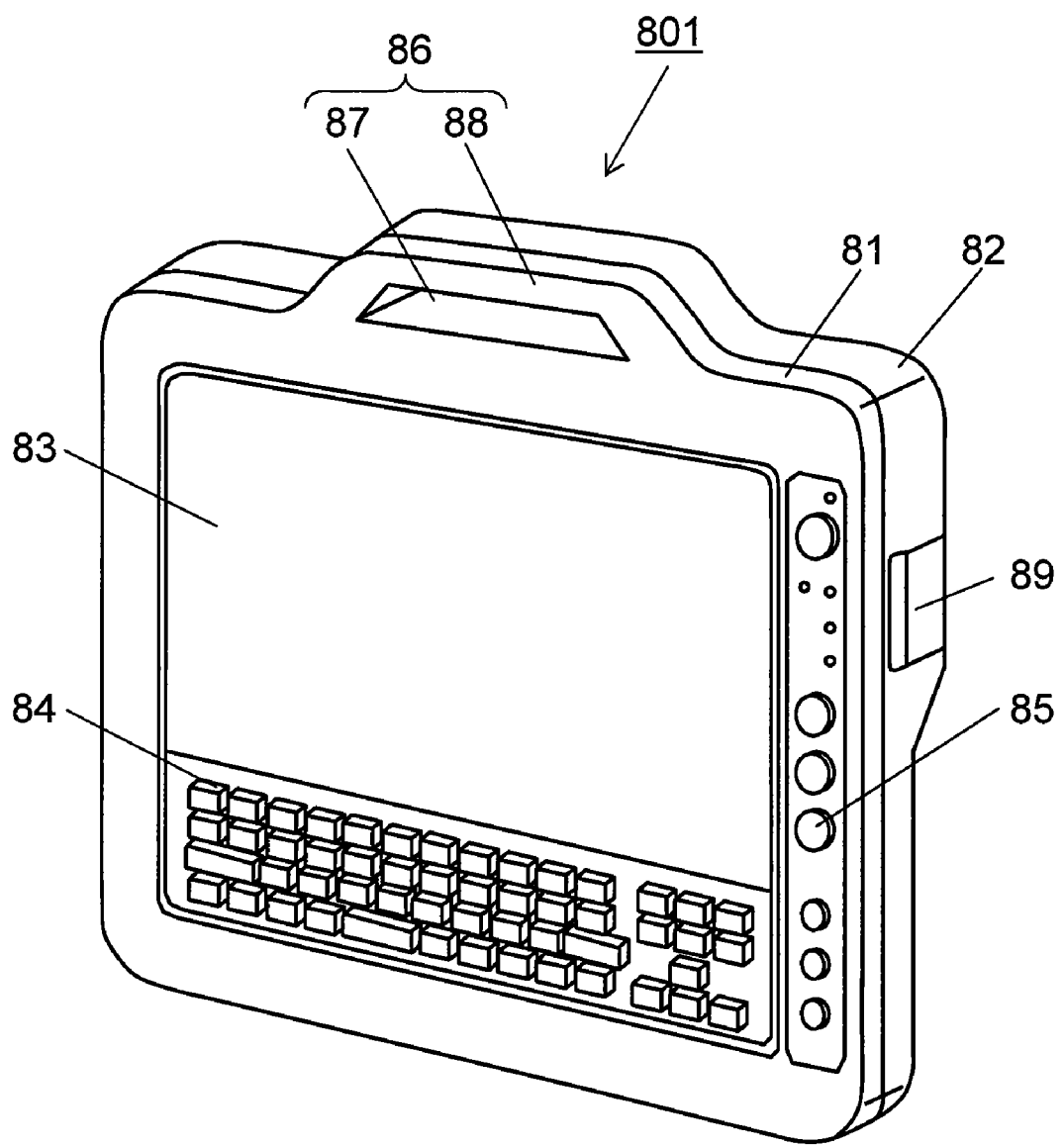
FIG. 9 is a perspective view of another example of the information processing device according to the fourth embodiment.

The third embodiment has described a NAVI, in which display part 53 and operation buttons 55 are arranged on the same side of the same casing. A fourth embodiment, on the other hand, will describe a PDA, in which a keyboard is also arranged on the same side as the display part. FIG. 8 is a perspective view of PDA 80 according to the fourth embodiment when seen from the front side. FIG. 9 is a perspective view of PDA 801 as another example of the fourth embodiment. As shown in FIGS. 8 and 9, PDAs 80 and 801 according to the present embodiment are provided on the front side with display part 83, keyboard 84, and operation buttons 85.

As shown in FIG. 8, PDA 80 is formed of front casing 81 and rear casing 82, which are molded from a resin or the like. Front casing 81 includes display part 83 such as a liquid crystal display, keyboard 84 for input, and operation buttons 85 for controlling visual information such as menu selection on the display screen. Thus, the user can perform all the operations of PDA 80 on the front side. As shown in FIG. 9, PDA 801 includes, in addition to the structure of PDA 80 of FIG. 8, handle 86 on the upper end of PDA 80, that is, above display part 83. Handle 86 includes grip 88 with space 87.

Rear casing 82 of PDA 80 according to the present embodiment will be described using FIGS. 5 and 6 because it has the same structure as rear casing 52 of NAVI 50 according to the third embodiment shown in FIGS. 5 and. 6.

Rear casing 82 is provided on the rear surface with substantially rectangular low surface area 56, high surface area 57 contiguous with low surface area 56, and stepped portion 58 on the boundary between low and high surface areas 56 and 57. High surface area 57 having a large thickness includes an internal space for housing, for example, batteries as the power supply of PDA 80. In this case, rear casing 52 is provided on a side surface thereof with cover 89 opened for battery replacement or with a connection terminal of an external device such as a USB flash device. High surface area 57 is provided substantially at its center with protrusion 60 having a spherical surface. Part of the bottom of protrusion 60 crosses stepped portion 58 and projects toward low surface area 56.

High surface area 57 is further provided with hand strap 62, which covers protrusion 60 and has through hole 61 in a position facing the top of protrusion 60. Hand strap 62 is fixed at both ends thereof to rear casing 52 by fixed parts 63a and 63b.

Fixed parts 63a and 63b can be changed in position so as to adjust the length of hand strap 62. Hand strap 62 is made of stretchable rubber or an elastic resin such as polybutylene terephthalate or elastomeric material.

As shown in FIG. 6, hand strap 62 includes fixed ends 62a and 62b, which are thicker than sliding part 62c through which the user slides the back of the hand. Fixed ends 62a and 62b are equal in height from high surface area 57, and larger in height than top 60a of protrusion 60 from high surface area 57. When PDA 80 is placed on a flat desk, sliding part 62c of hand strap 62 is elastically deformed by the weight of PDA 80 and flattened because it is thinner than fixed ends 62a and 62b. Fixed ends 62a and 62b, on the other hand, are thicker than sliding part 62c so as to be rigid, and have an equal or larger height than top 60a of protrusion 60 from high surface area 57. As a result, PDA 80 can be placed tilted securely on the desk. Thus, when PDA 80 is placed on the desk, display part 83 is tilted to improve visibility and the operability of keyboard 84 and operation buttons 85.

With this structure, fixed ends 62a and 62b perform the function as foot rubbers of PDA 80 so as to absorb impact caused by a placing operation and/or an input operation, resulting in an improvement in stability and/or operability. Such an impact can be caused, for example, when the user places PDA 80 on a desk, operates display part 83, or presses keyboard 84 or operation buttons 85.

The following is a description of how to hold PDA 80 according to the present embodiment in one hand and to operate it with the other hand. The user slides one hand between hand strap 62 and rear casing 82 of PDA 80, and holds protrusion 60 along its outer periphery with the palm of the hand while protruding the third joints of the index, middle, and annular fingers from through hole 61. As a result, the palm of the hand (see FIG. 3A) holding PDA 80 is in contact with protrusion 60 in a large area, and the back of the hand is in contact with hand strap 62 in a large area, thus establishing a firm contact between the hand and PDA 80. When the hand is slid between hand strap 62 and rear casing 82, the back of the hand corresponding to protrusion 60 projects from through hole 61. This reduces the incidence of compression and numbness of the hand. In addition, the friction force between the peripheral edge of through hole 61 and the back of the hand assists the user to securely hold PDA 80 in a desired direction without extra force.

Hand strap 62 used in the present embodiment, which is a belt fixed at two points, occupies so small a space that it is suitable for use in, for example, further compact PDAs and game machines.

Although hand strap 62 used in the present embodiment is a mere single belt, there is little risk of PDA 80 being dropped while the user holds it with the hand slid between PDA 80 and hand strap 62. This is because the user can press protrusion 60 by the palm bent along the outer periphery of protrusion 60 while protruding the third joints of the index, middle, and annular fingers from through hole 61 with these fingers bent. Thus, when using PDA 80 while standing, the user can hold it firmly and securely with one hand, resulting in a reduction in the risk of dropping it.

The user can hold PDA 80 with the palm and back of one hand, leaving the thumb and fingers free. Therefore, the user can place the tips of the thumb and fingers on the top end surface of rear casing 52 in the same manner as in FIG. 3A. This results in a further improvement in the stability of PDA 80 while it is being held. It is also possible that auxiliary buttons are arranged within the reach of fingertips so as to further improve operability.

In the present embodiment, hand strap 62 has through hole 61 from which third joints of one hand project. As a result, the user can securely hold PDA 80 at an arbitrary inclination (for example, 45 degrees) with respect to the hand. Thus, PDA 80 allows the user to hold it comfortably in one hand just in front of his/her face, thereby improving operability in, for example, key input and the visibility of display part 83.

In the present embodiment, rear casing 52 is provided on the rear surface with substantially rectangular low surface area 56, high surface area 57 contiguous with low surface area 56, and inclined stepped portion 58 on the boundary between low and high surface areas 56 and 57. Part of the bottom of protrusion 60 crosses stepped portion 58 and projects toward low surface area 56. This allows the user to place the part extending from third joints to the wrist of the hand on low surface area 56 when bending the palm of the hand along protrusion 60. As a result, the user is provided with a higher degree of freedom in adjusting the angle perpendicular to the palm holding PDA 80, thereby feeling much less fatigue.

As described above, PDA 80 as the information processing device according to the present embodiment allows the user to securely hold it in one hand slid between hand strap 62 and rear casing 82, and to operate operation buttons 85 with the other hand. This results in an improvement in operability and the visibility of display part 83. In addition, when inputting from keyboard 84, the user can see display part 83 and operate keyboard 84 in a comfortable position.

FIG. 9 is a perspective view of an example, other than PDA 80, of the information processing device according to the present fourth embodiment. In FIG. 9, PDA 801 is identical to PDA 80 of FIG. 8 except in having handle 86 on the upper end of PDA 80, that is, above display part 83. Handle 86 includes grip 88 and space 87. The presence of handle 86 facilitates the portability of PDA 801 and the transition from a state in which PDA 801 is held in one hand using hand strap 62 to a state in which PDA 801 is placed on the desk. When holding rear casing 82 in one hand as mentioned above, the user can slide the thumb and fingers of the hand into space 87 to hole PDA 801 more securely.

As described above, PDA 801 according to the present embodiment allows the user to securely hold it in one hand slid between hand strap 62 and rear casing 82, and to operate keyboard 84 and operation buttons 85 with the other hand. This results in an improvement in operability and the visibility of display part 83.

In the third and fourth embodiments, the display part is arranged in the front casing together with the keyboard and the operation buttons, which is a controller for controlling display signals displayed on the display part. Such structures of the third and fourth embodiments can also be applied, besides NAVIs and PDAs, to game machines and portable terminals used, for example, by nurses for inventory management or patient nursing care. The controller can be applied, besides control buttons, to a touch panel.

INDUSTRIAL APPLICABILITY

The information processing device of the present invention is particularly suitable for use in portable information processing devices because it allows the user to hold it firmly and securely in one hand, and to operate it with the other hand, thereby improving operability in, for example, key input.

The invention claimed is:

1. An information processing device comprising:
a rear casing;
a front casing facing the rear casing;
a protrusion protruding outwardly on a surface of the rear casing; and
a belt fixed to the rear casing so as to cover the protrusion, wherein a through hole is formed in the belt in a position corresponding to a top of the protrusion, wherein the through hole and the protrusion are respectively configured so that a user's palm is positioned on the protrusion and one or more of the user's knuckles are positioned through the through hole.

2. The information processing device of claim 1, wherein the front casing includes:
a display part for displaying visual information; and
a control button for controlling the visual information.

3. The information processing device of claim 1, wherein a shape of the protrusion is a spherical surface.

4. The information processing device of claim 1, wherein the rear surface includes:
a low area which shapes a rectangular surface;
a high area contiguous with the low area;
a stepped portion on a boundary between the low area and the high area,
the protrusion is formed in the high area; and
a part of a bottom of the protrusion crosses the stepped portion so as to protrude toward the low area.

5. The information processing device of claim 2, wherein the rear surface includes:
a low area which shapes a rectangular surface;
a high area contiguous with the low area; and
a stepped portion on a boundary between the low area and the high area,
the protrusion is formed in the high area; and
a part of a bottom of the protrusion crosses the stepped portion so as to protrude the low area.

6. The information processing device of claim 4, wherein the rear surface includes:
a low area which shapes a rectangular surface;
a high area contiguous with the low area; and
a stepped portion on a boundary between the low area and the high area,
the protrusion is formed in the high area; and a part of a bottom of the protrusion crosses the stepped portion so as to protrude toward the low area.

7. The information processing device of claim 1, wherein the through hole is formed at the center of the belt.

8. The information processing device of claim 1, wherein the through hole is formed in the belt in a position corresponding to a top of the protrusion.

9. The information processing device of claim 1, wherein the through hole is substantially a circular through hole.

10. The information processing device of claim 1, wherein the through hole is substantially an oval through hole.

* * * * *